United States Patent Office 3,837,963
Patented Sept. 24, 1974

3,837,963
COMPOSITION AND PROCESS FOR SEALING SURFACES
Elliott Frauenglass, Newington, and Bruce D. Murray, East Hartford, Conn., assignors to Loctite Corporation, Newington, Conn.
No Drawing. Filed Oct. 18, 1971, Ser. No. 190,261
Int. Cl. C08f 3/64; C09j 5/04
U.S. Cl. 156—310
14 Claims

ABSTRACT OF THE DISCLOSURE

Two part sealant compositions for use on rigid surfaces are presented, which combine effective sealing capability with ease of disassembly. A pretreating composition containing a film forming substance and a polymerization catalyst is applied to the surfaces to be sealed, and serves to activate the hardenable sealant when applied and also to reduce adhesion of the sealant to the surfaces to aid in disassembly.

BACKGROUND OF THE INVENTION

This invention concerns products and processes for effectively sealing rigid non-porous surfaces. The sealant composition is of the polymerizable variety, and is used in the form of a liquid, paste or gel, or other readily deformable state. Due to its nature, this type of sealant can conform to the imperfections and irregularities of the surfaces to be sealed, and then polymerize to form an effective, rigid seal of high quality.

Used in conjunction with the sealant is a second component containing two primary functional ingredients. The first is an accelerator or catalyst which causes polymerization of the sealant to occur, as will be more fully described below. The second ingredient is a film forming organic compound which, in effect, materially reduces or substantially eliminates the normal adhesive bond which is formed between the surfaces to be sealed and the polymerizable sealant. This, then, permits convenient disassembly without substantial damage to the surfaces which are sealed.

The most common of the polymerizable sealants are anaerobic sealants, or compositions chemically related thereto. Anaerobic sealants, which will be discussed more fully hereafter, are disclosed, for example, in U.S. Pats. 2,895,950 to Krieble, issued July 21, 1959; 3,218,305 to Krieble, issued Nov. 16, 1965; 3,425,988 to Gorman et al., issued Feb. 4, 1969; and 3,547,851 to Frauenglass, issued Dec. 15, 1970.

Anaerobic and other polymerizable sealants offer many advantages in sealing applications. Since they are spreadable on the surfaces to be sealed, the problems of cutting sheet gaskets are eliminated. Further, they eliminate the need to store large numbers of various types and sizes of preformed gasket materials. The effectiveness of sealants of this type has been noted above.

One of the prime shortcomings of anaerobic and other polymerizable sealants which have been used in sealing applications, has been the relatively strong bond which they generally form to the surfaces which are to be sealed. Usually the surfaces, such as flanges, are disassembled only with great effort, and then frequently only with severe damage being done to the surfaces themselves by the use of disassembly tools, heat or strong chemicals.

A sealant composition and process which avoided the significant problems of the prior art noted above would be a most novel and useful development, and a material advance in the art of sealing rigid surfaces.

THE INVENTION

This invention relates to two part sealant compositions or systems. The first part is a polymerizable sealant and contains a polymerizable monomer and a redox activated free radical polymerization initiator therefor, such initiator being of a type, and being used in such amount, as to be insufficient to initiate polymerization of the monomer at room temperature. The second part of the sealant composition is a solvent-based surface pretreatment agent containing two active ingredients. The first active ingredient is a redox catalyst capable of substantially accelerating the formation of free radicals by the free radical initiator of the polymerizable sealant upon contact therewith. Thus, upon contact of the catalyst and the polymerizable sealant, polymerization of the monomer will commence. As a second active ingredient, the pretreating agent contains a film forming organic compound, the function of which is to provide a low adhesion layer between the surface to which it is applied, and the subsequently cured sealant.

In another aspect of the invention a process for removably sealing two surfaces is provided, which comprises (a) applying to at least one of the surfaces to be sealed, the solvent-based pretreating agent described in the preceding paragraph; (b) applying to at least one of said surfaces or as a layer over the pretreating agent of item (a), the polymerizable sealant described in the preceding paragraph; and (c) placing the surfaces so treated in abutting relation until the polymerizable sealant has hardened to form an assembly of at least two surfaces having an effective, durable seal therebetween, said assembly being easily disassembled due to the presence of the layer of low adhesion between the sealant and at least one of said surfaces.

DISCUSSION OF THE INVENTION AND ITS PREFERRED EMBODIMENTS

The Polymerizable Sealant

The polymerizable sealant composition used in the invention disclosed herein, can be any flowable or readily deformable composition which hardens due to the polymerization of one of its major components, a free radical polymerizable monomer. This is accomplished by the use of a monomer containing ethylenic unsaturation, in combination with a free radical polymerization initiator which is substantially inactive at room temperature, but which is rendered room temperature active by contact with a redox catalyst. Typical examples of common ethylenically unsaturated monomers are the vinyl monomers (monomers having a terminal ethylenic double bond) such as vinylchloride, styrene and acrylonitrile.

The free radical initiators which can be mixed with the polymerizable monomer are essentially all of the commonly known room temperature inactive peroxy free radical initiators (e.g., those which have a half life of five hours or greater at 100° C.). Examples of materials of this type are t-butyl peracetate and dialkyl peroxides such as di-t-butyl peroxide and 2,5-dimethyl-2,5-di(t-butyl peroxy) hexane.

For purposes of this invention, a highly preferred class of sealants has been found to be the class of anaerobic sealants, mixtures of polymerizable acrylate esters and free radical initiators therefor. Polymerization of these acrylate ester based sealants is effectively inhibited by the minor amount of oxygen which is dissolved in the sealant, or which is retained in the air space of a partially empty bottle. Further stability is obtained by the use of low density polyethylene bottles for said sealants, since such plastics are air permeable and oxygen will penetrate into the sealant through the bottle wall. The invention herein will be described hereafter principally by reference to these preferred anaerobic sealants.

When anaerobic sealants are used, preferably at least a portion of the acrylate monomer is a di- or other polyacrylate ester. These poly-functional monomers produce cross-linked polymers, which serve as more effective and more durable sealants and adhesives.

The polyacrylate esters may be represented by the formula (1)
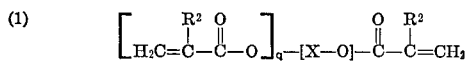

wherein $R^2$ is a radical selected from the group consisting of hydrogen, halogen and alkyl of from 1 to about 4 carbon atoms; $q$ is an integer equal to at least 1, and preferably equal to from 1 to about 4; and X is an organic radical containing at least two carbon atoms and having a total bonding capacity of $q$ plus 1. With regard to the upper limit for the number of carbon atoms in X, workable monomers exist at essentially any value. As a practical matter, however, a general upper limit is about 50 carbon atoms, preferably 30, and most preferably about 20. Preferably X is a hydrocarbon radical, said radical containing any substituent or linkage which does not adversely affect the acrylate monomer for use in the compositions and processes of the invention disclosed herein.

The most highly preferred acrylate esters for use in the anaerobic sealants are polyacrylate esters which have the following general formula (2)
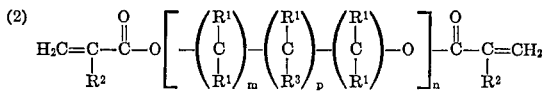

wherein $R^1$ represents a radical selected from the group consisting of hydrogen, lower alkyl of from 1 to about 4 carbon atoms, hydroxy alkyl of from 1 to about 4 carbon atoms, and

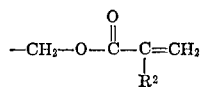

$R^2$ is a radical selected from the group consisting of hydrogen, halogen, and lower alkyl of from 1 to about 4 carbon atoms; $R^3$ is a radical selected from the group con- of hydrogen, hydroxyl, and

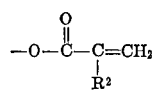

$m$ is an integer equal to at least 1, e.g., from 1 to about 15 or higher, and preferably from 1 to about 8 inclusive; $n$ is an integer equal to at least 1, e.g., 1 to about 40 or or more, and preferably between about 2 and about 10; and $p$ is one of the following: 0, 1.

Typical examples of polyacrylate esters corresponding to the above general formula are di-, tri- and tetraethylene-glycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

Monofunctional acrylate esters (esters containing one acrylate group) also may be used in the anaerobic sealants. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most preferably the polar group is selected from the group consisting of labile hydrogen, heterocyclic ring, hydroxy, amino, cyano, and halogen polar groups. Typical examples of compounds within this category are cyclohexyl methacrylate, tetrahydrofurfuryl methacrylate, hydroxyethyl acrylate, hydroxypropyl methacrylate, t-butylaminoethyl methacrylate, cyanoethyl acrylate, and chloroethyl methacrylate.

As indicated above the anaerobic compositions as discussed herein are prepared by mixing a peroxy initiator with one or more acrylate esters as described above. While various peroxy compounds (generally dialkyl peroxides) have been disclosed as useful initiators in, e.g., U.S. Pats. 3,419,512 to Lees, issued Dec. 31, 1968 and 3,479,246 to Stapleton, issued Nov. 18, 1969, the hydroperoxides are highly superior and constitute a highly preferred embodiment. The real benefit of the non-hydroperoxide initiators is as a co-initiator with the hydroperoxides to make the cure properties of the anaerobic composition more universal.

Hydrogen-peroxide may be used, but the most desirable polymerization initiators are the organic hydroperoxides. Included within this definition are materials such as organic peroxides or organic peresters which decompose or hydrolyze to form organic hydroperoxides in situ. Examples of such peroxides and peresters are cyclohexyl hydroxycyclohexyl peroxide and t-butyl perbenzoate respectively.

While the nature of the organic hydroperoxides is not critical to the broad concept of this invention, the general class of hydroperoxides can be represented by the formula $R^4OOH$, wherein $R^4$ generally is a hydrocarbon group containing up to about 18 carbon atoms, and preferably is an alkyl, aryl or aralkyl hydrocarbon group containing from about 3 to about 12 carbon atoms. Naturally $R^4$ can contain any substituent or linkage, hydrocarbon or otherwise, which does not affect the hydroperoxide adversely for the purpose disclosed herein. Typical examples of such organic hydroperoxides are cumene hydroperoxide, tertiary butyl hydroperoxide, methylethylketone hydroperoxide, and hydroperoxides formed by oxygenation of various hydrocarbons such as methylbutene, cetane, and cyclohexene, and various ketones and ethers, including certain compounds represented by the general formula (2) above.

The peroxy initiators can be used within wide ranges, e.g., up to about 20% by weight of the composition. Most commonly, however, they comprise no more than about 10 percent by weight of the composition since above that level adverse effects on the strength and durability of the cured composition may be experienced. While in some instances lower amounts can be used, about 0.1% by weight of the composition is a common lower limit. Preferably the peroxy initiator comprises from about 0.1% to about 5% by weight of the composition.

Common additives for anaerobic sealants are latent polymerization accelerators, compounds which do not of themselves initiate cure, but which accelerate the cure once it has been started by the polymerization initiator. It should be noted that large numbers polymerization accelerators are known in the art, and the broad concept of this invention is intended to encompass any polymerization accelerator which can be incorporated in the anaerobic sealant without destroying the essential characteristics of such sealant. Typical examples of suitable latent polymerization accelerators are primary, secondary and tertiary amines, such as octyl amine, dehexyl amine and tributyl amine; sulfimides, such as benzoic sulfimide; and amides, such as formamide. Latent accelerators generally can comprise up to about 8 percent by weight of the anaerobic sealant, and preferably between about 0.5 and about 5 percent by weight.

For an expanded discussion of latent polymerization accelerators for anaerobic sealants, reference is made to U.S. Pats. 3,041,322 to Krieble, issued June 26, 1962; 3,046,262 to Krieble, issued July 24, 1962; and 3,218,305 to Krieble, issued Nov. 16, 1965.

Other ingredients can be used in the anaerobic sealants, and in its preferred aspects polymerization inhibitors are included to offer protection against spurious polymerization prior to the time of intended use. The quinones have been found to be a particularly effective class of polymerization inhibitors, and can be used herein. Examples of such quinones are β - naphthoquinone, 2 - methoxy-1,4-naphthoquinone, and p-benzoquinone.

Other typical ingredients which can be used if desired to impart commercially desirable properties to the anaerobic sealants are thickeners, plasticizers, dyes, adhesive agents and thixotropic agents. Such materials can be used in such combinations and proportions as is desired, provided they do not affect adversely the anaerobic nature of the composition. While exceptions may exist in some cases, these materials in toto generally do not comprise more than about 50 percent by weight of the total composition, and preferably not more than about 20 percent by weight of the composition.

For purposes of this invention, it is preferred for the anaerobic sealant to be in the form of a thick paste, a gel, or a liquid having a minimum viscosity of about 2,000 centipoise, and preferably about 5,000 centipoise. Such sealants are easier to use in sealing applications than thinner liquids.

The Surface Pretreating Agent

As indicated above, the surface pretreating agent is a solvent solution or dispersion of two key ingredients. The first key ingredient in the surface pretreating agent is an organic film forming compound of low adhesive character to the surface which is to be sealed. Since metal surfaces are generally involved, low adhesion to metal surfaces is important. It also is essential for the film forming compound to be substantially insoluble in the sealant which is used. If this is not the case, sufficient film forming substance may dissolve or diffuse into the sealant prior to hardening of the sealant to destroy the effectiveness of the film forming compound in reducing adhesion between the sealant and surface.

A suitable class of film forming organic compounds is the class of low adhesion thermoplastic materials, such as halogenated hydrocarbon polymers (e.g., polytetrafluoroethylene, polydichlorodifluoroethylene), pure hydrocarbon polymers (e.g., polyethylene and polypropylene) and vinyl-based polymers such as acrylonitrile/butadiene/styrene copolymers. Another suitable class of organic film forming compounds are the fatty hydrocarbons, and derivatives thereof, such as fatty acids, amides, alcohols, esters, etc. Preferably, the fatty substance contains a carbon chain having between about 10 and about 30 carbon atoms. Examples of specific useful materials in this category are potassium palmitate and octadecane.

The single most highly preferred organic film forming substances for use in the invention disclosed herein are the lecithins, a group of well-known and naturally occurring waxy amino-phosphatides. Lecithins have been found to be uniquely applicable over wide ranges of temperatures, as well as in extremely thin films when applied to the surfaces to be sealed. The ability to use this material under essentially all conditions encountered in industry and over a wide range of temperatures makes this a particularly suitable substance for use in the compositions and processes disclosed herein.

The second key ingredient used in the surface pretreating agent is a redox catalyst for increasing the production of free radicals upon contact with the free radical initiator of the sealant composition. This ingredient is of particular importance when the sealant used is an anaerobic sealant. The cure of anaerobic sealants in most cases is substantially accelerated by contact with metal surfaces. Since the film forming compound of necessity insulates the sealant from contact with the metal surface, this important benefit is lost. Hence, the redox catalyst is required to provide rapid hardening of the sealant.

The specific redox catalyst chosen will depend in large part upon the specific free radical initiator which is utilized, and desirable ingredients for use in combination with a specific free radical initiator will be well known to the reasonably skilled chemist in the art. For example, with regard to the preferred hydroperoxide initiators of the anaerobic sealants, the following classes of redox initiators have been found to be most desirable:

(a) organic compounds containing oxidizable transition metals, typical examples being metal soaps such as copper octoate, and iron naphthenate;

(b) organic sulfur containing free radical accelerators, such as mercaptans and disulfides, and particularly organic compounds containing an

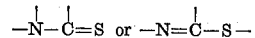

linkage. such as mercaptobenzothiazole, thiourea and N-substituted thioureas (particularly N-alkyl subtuted thioureas); and (c) condensation reaction products of an aldehyde with a primary or secondary amine, such as the condensation reaction products of butyraldehyde and analine or hydrocinnamic aldehyde and butylamine.

For an expanded discussion of redox catalysts of the above types, reference is made to U.S. Pat. 3,591,438 to *Toback et al.,* issued July 6, 1971.

The concentration of the ingredients used in the surface pretreating agent is primarily a question of convenience, since essentially the same results can be obtained with a heavy application of a low concentration pretreating agent to a surface, as with a light application of a high concentration pretreating agent. A reasonable amount of routine testing easily will permit the reasonably skilled worker in the art to establish practical and suitable use levels. As a general rule and guideline, however, it has been found that acceptable concentrations of redox catalysts in the solvent solution generally are found between about 0.1% to about 10% by weight, and preferably from about 0.57 to about 5.0% by weight. The organic film forming compound generally is used between about 1% and about 15%, and preferably between about 2% and about 10%. Within these ranges a single uniform coating by spreading, spraying or otherwise onto the surface or surfaces to be sealed, will produce adequate coverage to achieve the intended results.

In utilizing the above compositions in the sealing process of this invention, the surface pretreating agent is applied to at least one of the surfaces to be sealed. Preferably, it is applied to all surfaces which are to be sealed as this will permit the easy removal of the cured sealant from all surfaces at the time of disassmbly, which frequently is necessary in order to properly prepare the surface for a subsequent resealing operation. For the broad purposes of this invention, however, it is adequate that the surface pretreating agent be coated onto a single surface and the liquid sealant applied thereover, or to the opposite sealing surface.

When assembled in this way, the low adhesive film will exist between the sealant and at least one of the surfaces to be sealed, and this low adhesive layer will permit ready disassembly at some future date. In spite of the fact that disassembly will be relatively easy, the fact that the sealant is applied in a readily flowable or deformable state will allow it to conform entirely to the surface to be sealed, even though a film of the organic film former has been applied thereover. In this way, maximum "fitting" of the sealant to the contours and imperfections of the surfaces to be sealed is obtained prior to the time when the sealant hardens. An effective seal is formed, superior to those obtained with the application of a preformed sealant, which is deformed only with substantial force and which produces relatively little flow to fit the contours or imperfections of the surfaces to be sealed. As an additional benefit seals can be made as required, which eliminates the need for storage of many sizes and types of preformed seals or sheets of sealing materials.

As a general rule, the sealant compositions of the invention disclosed herein will harden within a matter of hours, although suitable systems can be devised to provide reasonable hardening in one hour or less, if that is required.

EXAMPLES

The following examples are presented to demonstrate the use of compositions and processes within the scope of the invention disclosed herein. These examples are not intended to be limitations in any way upon the broad scope of the invention. Unless specifically stated to the contrary therein, all ratios and percentages in the following examples are on a weight basis.

Example I

A soft gelatin-like anaerobic sealant material was prepared, having the following approximate composition:

| Ingredients: | Approx. weight percent |
|---|---|
| Polyethyleneglycol dimethacrylate (average molecular weight=330) | 57.6 |
| "Bisphenol A"-fumarate | 31.8 |
| Fumed silica | 4.4 |
| Cumene hydroperoxide | 2.6 |
| Glycerine | 2.6 |
| Dimethyl-p-toluidine | 1.0 |
| p-Benzoquinone, 100 parts per million by weight. | |

This composition was mixed under high shear until a uniform dispersion of the ingredients was obtained. Upon cessation of the mixing, a gelatin-like sealant formed.

This sealant then was used in conjunction with a series of surface pretreating agents to bond aluminum tensile flanges in a standard sealing test, ASTM Test F–64–69. In this test, annular flanges having a surface area of about seven square inches are sealed using the sealant in question. The flanges are coated with the sealant, placed in fact to face alignment, and then securely fixed together by inserting a threaded bolt through the annular opening, and tightening a mating nut thereover to a predetermined torque of 50 ft. lbs. After storing the assembly at 250° F. for 72 hours, the ease of disassembly is determined by removing the nut and bolt, measuring the tensile force required to separate the flanges, and then making an inspection to determine the ease with which the sealant is removed from the flange surface. In this test, the surface pretreating agent was coated uniformly in a single application to both flange surfaces before application of the sealant material.

Five surface pretreating agents were prepared, using dichloromethane as solvent. Surface pretreating agent #1 served as "Control," and contained 5% dibutylthiourea by weight of the solution as a redox catalyst, but no organic film forming compound. Surface pretreating agents 2, 3, 4 and 5 were the same as 1, except that each also contained 5% by weight of the solution of a film forming organic compound. The specific film forming compounds are identified below in Table I, accompanied by the respective results of the above-described ASTM F–64–69 test.

TABLE I

| Sample | Organic film forming compound | Tensile force to separate (p.s.i.) | Ease of removal |
|---|---|---|---|
| 1[1] | 0 | 78 | Difficult-chemical stripping agent required. |
| 2 | Octadecane | 54 | Scraped off cleanly with blade. |
| 3 | "Kralastic" acrylonitrile/butadiene/styrene resin. | 32 | Do. |
| 4 | Potassium palmitate | 25 | Flaked off. |
| 5 | Lecithin | 28 | Do. |

[1] Control.

When, in the above test, the organic film forming compound was replaced by powdered polytetrafluoroethylene resin, octadecyl dimethyl amine or glycerol tristearate, substantially similar results are obtained in that the sealed assemblies are easily disassembled and the sealant easily removed from the flange surfaces.

Example II

The test of Example I was repeated, using the anerobic sealant having the following approximate composition:

| Ingredients: | Approx. weight percent |
|---|---|
| Polyethyleneglycol dimethacrylate (of Example I) | 41.2 |
| "Bisphenol A"-fumarate | 37.9 |
| Diethyl-p-toluidine | 0.5 |
| Dimethyl-o-toluidine | 0.3 |
| Benzoic sulfimide | 0.4 |
| Cumene hydroperoxide | 2.5 |
| Mica | 16.9 |
| Fumed silica | 0.3 |
| p-Benzoquinone, 100 parts per million by weight. | |

As a "Control" surface pretreating agent, the following solvent solution of redox catalysts was used:

| Ingredients: | Approx. weight percent |
|---|---|
| Mercaptobenzothiazole | 1.5 |
| Dimethyl-p-toluidine | 1.5 |
| Isopropanol | 7.0 |
| Trichloroethylene | 90.0 |

As a surface pretreating agent within the scope of this invention, a solution identical to the "Control" of the preceding paragraph was used, to which had been added five percent by weight lecithin.

Following the completion of the 72 hour 250° F. storage, a tensile force of 161 lbs./sq. inch was required to separate the flanges which had been sealed using the "Control" surface pretreating agent, and removal of the hardened sealant from the flanges required the use of chemical stripping agents. By way of contrast, a tensile force of only 22 lbs./sq. inch was required to separate the flanges sealed with the composition and process of this invention, and the sealant composition was easily flaked from the flange surfaces.

What is clamied is:

1. A two-part sealant composition for sealing surfaces comprising (a) as a first part, a polymerizable sealant comprising a free radical polymerizable monomer and a redox activated initiator of free radical polymerization, said initiator of free radical polymerization being used in an amount insufficient to polymerize said monomer at room temperature; and (b) as a second part, a surface pretreating agent comprising a solvent solution containing (1) a redox catalyst capable of accelerating the production of free radicals by said initiator of free radical polymerization upon contact therewith and commencing polymerization of said monomer, and (2) a film-forming organic compound which is substantially insoluble in (a) above, and which upon evaporation of the solvent forms a film which results in relatively low strength adhesive bonds to the surfaces to be sealed while permitting a durable seal between said surfaces.

2. The composition of Claim 1 wherein the free radical polymerizable monomer is a polymerizable acrylate ester monomer, and the initiator of free radical polymerization is a hydroperoxy initiator comprising from about 0.1% to about 20% by weight of the composition.

3. The composition of Claim 2 wherein the redox catalyst is selected from the class consisting of:
   (a) compounds containing oxidizable transition metals;
   (b) sulfur containing free radical accelerators; and
   (c) condensation reaction products of an aldehyde and a primary or secondary amine.

4. The composition of Claim 3 wherein the film forming organic compound is selected from the class consisting of thermoplastic polymers, and fatty hydrocarbons or derivatives thereof having at least one carbon chain of from about 10 to about 30 carbon atoms.

5. The composition of Claim 4 wherein the film forming organic compound is lecithin.

6. The composition of Claim 2 wherein the polymerizable sealant has a viscosity of at least about 2,000 centipoise.

7. The composition of Claim 2 wherein the polymerizable acrylate ester has the formula

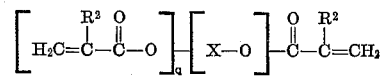

wherein $R^2$ is a radical selected from the group consisting of hydrogen, halogen and alkyl of from 1 to about 4 carbon atoms, $q$ is an integer equal to at least 1, and X is an organic radical containing at least two carbon atoms and having a total bonding capacity of $q$ plus 1; and the hydroperoxy initiator is an organic hydroperoxide having the formula $R^4OOH$ wherein $R^4$ is a hydrocarbon group containing up to about 18 carbon atoms.

8. A process for removably sealing surfaces which comprises:
  (a) applying to at least one of said surfaces a solvent solution containing a redox catalyst and a film-forming organic compound, and allowing said solvent to evaporate, thereby forming a film from said organic compound;
  (b) applying to at least one of said surfaces a polymerizable sealant comprising a free radical polymerizable monomer and a redox activated initiator of free radical polymerization; and
  (c) placing the surfaces so treated in abutting relation until the sealant has polymerized to form a durable seal between said surfaces;
said redox catalyst being capable of accelerating the production of free radicals by said initiator of free radical polymerization upon contact therewith and commencing polymerization of said monomer, and said film-forming organic compound being substantially insoluble in said polymerizable sealant and resulting in relatively low strength adhesive bonds to said surfaces.

9. The process of Claim 8 wherein the free radical polymerizable monomer is a polymerizable acrylate ester monomer, and the initiator of free radical polymerization is a hydroperoxy initiator comprising from about 0.1% to about 20% by weight of the composition.

10. The process of Claim 9 wherein the redox catalyst is selected from the class consisting of:
  (a) compounds containing oxidizable transition metals;
  (b) sulfur containing free radical accelerators; and
  (c) condensation reaction products of an aldehyde and a primary or secondary amine.

11. The process of Claim 10 wherein the film forming organic compound is selected from the class consisting of thermoplastic polymers, and fatty hydrocarbon or derivatives thereof having at least one carbon chain of from about 10 to about 30 carbon atoms.

12. The process of Claim 11 wherein the film forming organic compound is lecithin.

13. The composition of Claim 12 wherein the polymerizable sealant has a viscosity of at least about 2,000 centipoise.

14. The process of Claim 8 wherein the polymerizable acrylate ester has the formula

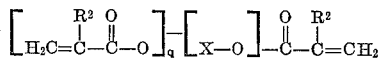

wherein $R^2$ is a radical selected from the group consisting of hydrogen, halogen and alkyl of from 1 to about 4 carbon atoms, $q$ is an integer equal to at least 1, and X is an organic radical containing at least two carbon atoms and having a total bonding capacity of $q$ plus 1; and the hydroperoxy initiator is an organic hydroperoxide having the formula $R^4OOH$ wherein $R^4$ is a hydrocarbon group containing up to about 18 carbon atoms.

References Cited

UNITED STATES PATENTS

| | | | |
|---|---|---|---|
| 3,658,624 | 4/1972 | Lees | 156—332 |
| 3,547,851 | 12/1970 | Frauenglass | 260—23.5 R |
| 3,591,438 | 7/1971 | Toback | 156—332 |
| 3,794,610 | 2/1974 | Bachmann | 260—89.5 R |
| 3,419,512 | 12/1968 | Lees et al. | 260—89.5 R |

OTHER REFERENCES

Editors of Modern Plastics Encyclopedia, "Guide to Plastics," 1970, pp. 158, 161, 164.

McGraw-Hill, "Modern Plastics Encyclopedia," 1968, pp. 466–467.

CHARLES E. VAN HORN, Primary Examiner

B. J. LEWRIS, Assistant Examiner

U.S. Cl. X.R.

156—332; 161—188; 260—23.5 R, 89.5 R

UNITED STATES PATENT OFFICE
CERTIFICATE OF CORRECTION

Patent No. 3,837,963     Dated Sept. 24, 1974

Inventor(s) Elliott Frauenglass and Bruce D. Murray

It is certified that error appears in the above-identified patent and that said Letters Patent are hereby corrected as shown below:

Column 6, Line 40 - Delete "0.57" and substitute --0.5%--

Signed and sealed this 24th day of December 1974.

(SEAL)
Attest:

McCOY M. GIBSON JR.
Attesting Officer

C. MARSHALL DANN
Commissioner of Patents